US009576423B2

(12) United States Patent
Shai-Hee

(10) Patent No.: US 9,576,423 B2
(45) Date of Patent: Feb. 21, 2017

(54) GAMING SYSTEM AND METHOD OF GAMING

(71) Applicant: Aristocrat Technologies Australia Pty Limited, North Ryde (AU)

(72) Inventor: Michael A. Shai-Hee, Kingsgrove (AU)

(73) Assignee: Aristocrat Technologies Australia Pty Ltd., North Ryde (AU)

( * ) Notice: Subject to any disclaimer, the term of this patent is extended or adjusted under 35 U.S.C. 154(b) by 13 days.

(21) Appl. No.: 14/745,057

(22) Filed: Jun. 19, 2015

(65) Prior Publication Data

US 2015/0287271 A1 Oct. 8, 2015

Related U.S. Application Data

(63) Continuation of application No. 13/612,168, filed on Sep. 12, 2012, now abandoned, which is a continuation of application No. 12/408,475, filed on Mar. 20, 2009, now Pat. No. 8,287,361.

(30) Foreign Application Priority Data

Mar. 20, 2008 (AU) ................................ 2008901383

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ....... *G07F 17/3213* (2013.01); *G07F 17/3265* (2013.01); *G07F 17/34* (2013.01)

(58) Field of Classification Search
CPC ...... G07F 17/32; G07F 17/34; G07F 17/3213; G07F 17/3211
See application file for complete search history.

(56) References Cited

U.S. PATENT DOCUMENTS

| | | | |
|---|---|---|---|
| 5,769,716 A | 6/1998 | Saffari et al. | |
| 5,833,536 A | 11/1998 | Davids et al. | |
| 6,089,977 A * | 7/2000 | Bennett .................. | G07F 17/34 273/143 R |

(Continued)

FOREIGN PATENT DOCUMENTS

| | | |
|---|---|---|
| EP | 1557800 | 7/2005 |
| EP | 1635306 | 3/2006 |

(Continued)

OTHER PUBLICATIONS

United States Patent and Trademark Office, "Notice of Allowance," issued in connection with U.S. Appl. No. 12/408,475, mailed on Jun. 12, 2012, 15 pages.

(Continued)

*Primary Examiner* — Steven J Hylinski
(74) *Attorney, Agent, or Firm* — Armstrong Teasdale LLP

(57) ABSTRACT

A method of populating symbol spaces on a gaming device includes providing a plurality of designated spaces arranged to display a plurality of symbols, wherein one of the designated spaces is populated with a symbol from the plurality of symbols by moving the symbol from an initial location, to a final location within the designated space, wherein the game outcome is at least partly dependent on the final location of the symbol.

21 Claims, 9 Drawing Sheets

(56) References Cited

U.S. PATENT DOCUMENTS

| | | | | |
|---|---|---|---|---|
| 6,290,600 | B1 | 9/2001 | Glasson | |
| 6,311,976 | B1 | 11/2001 | Yoseloff et al. | |
| 6,517,432 | B1 | 2/2003 | Jaffe | |
| 6,551,187 | B1 | 4/2003 | Jaffe | |
| 6,565,433 | B1 | 5/2003 | Baerlocher et al. | |
| 6,644,664 | B2 | 11/2003 | Mulr et al. | |
| 6,666,766 | B2 | 12/2003 | Baerlocher et al. | |
| 6,786,818 | B1 | 9/2004 | Rothschild et al. | |
| 6,805,632 | B2 | 10/2004 | Suda | |
| 7,037,191 | B2 | 5/2006 | Rodgers et al. | |
| 7,077,745 | B2 | 7/2006 | Gomez et al. | |
| 7,252,592 | B2 | 8/2007 | Rodgers et al. | |
| 7,371,170 | B2 | 5/2008 | Cregan et al. | |
| 7,674,176 | B2 | 3/2010 | Berman et al. | |
| 7,690,985 | B1 | 4/2010 | Muskin et al. | |
| 7,749,068 | B2 * | 7/2010 | Cuddy | G07F 17/32 463/16 |
| 8,444,473 | B2 | 5/2013 | Ching et al. | |
| 2004/0048646 | A1 * | 3/2004 | Visocnik | G07F 17/32 463/16 |
| 2004/0229679 | A1 | 11/2004 | Anderson et al. | |
| 2005/0288087 | A1 | 12/2005 | Meyer | |
| 2006/0030387 | A1 | 2/2006 | Jackson | |
| 2006/0068881 | A1 | 3/2006 | Casey | |
| 2007/0173307 | A1 * | 7/2007 | Aida | G07F 17/34 463/16 |
| 2008/0051174 | A1 | 2/2008 | Fiden | |
| 2008/0058099 | A1 | 3/2008 | Schwartz et al. | |
| 2008/0234032 | A1 | 9/2008 | Brunt de Courssou et al. | |
| 2009/0186684 | A1 | 7/2009 | Visser | |
| 2009/0247270 | A1 | 10/2009 | Shai-Hee | |
| 2013/0005432 | A1 | 1/2013 | Shai-Hee | |

FOREIGN PATENT DOCUMENTS

| | | |
|---|---|---|
| JP | 7313659 | 12/1995 |
| JP | 7313660 | 12/1995 |
| JP | 9234276 | 9/1997 |
| JP | 2003334329 | 11/2003 |
| JP | 2006239465 | 9/2006 |
| WO | 2006053139 | 5/2006 |
| WO | 2007002935 | 1/2007 |

OTHER PUBLICATIONS

United States Patent and Trademark Office, "Non-Final Office Action," issued in connection with U.S. Appl. No. 12/408,475, mailed on Sep. 27, 2011, 20 pages.

United States Patent and Trademark Office, "Non-Final Office Action," issued in connection with U.S. Appl. No. 13/612,168, mailed on Mar. 13, 2013, 11 pages.

United States Patent and Trademark Office, "Non-Final Office Action," issued in connection with U.S. Appl. No. 13/612,168, mailed on Dec. 24, 2014, 9 pages.

* cited by examiner

GAMING SYSTEM AND METHOD OF GAMING

CROSS-REFERENCE TO RELATED APPLICATIONS

The present application claims the benefit of priority to U.S. patent application Ser. No. 13/612,168, filed on Sep. 12, 2012, entitled "A GAMING SYSTEM AND A METHOD OF GAMING,", which claims the benefit of priority to U.S. patent application Ser. No. 12/408,475, filed on Mar. 20, 2009, entitled "A GAMING SYSTEM AND A METHOD OF GAMING," and Australian Provisional Patent Application No. 2008901383, filed on Mar. 20, 2008, entitled "A GAMING SYSTEM AND METHOD OF GAMING", both of which are herein incorporated by reference in their entireties.

FIELD OF THE INVENTION

The present invention relates to a gaming system and a method of gaming and in particular, but not exclusively, to a system and method for the display of a game outcome.

BACKGROUND OF THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a spinning reel machine provided with reels with each reel carrying several symbols of the set, or a video machine wherein selected symbols are displayed on virtual reels on a graphical display device. Win outcomes can occur based on symbols appearing in one or more horizontal lines, diagonal lines, or any other predetermined way.

While such gaming systems provide users with enjoyment, the need exists for alternative gaming systems which maintain or increase player enjoyment.

SUMMARY OF THE INVENTION

In accordance with a first aspect, the present invention provides a method of populating symbol spaces on a gaming device, including, providing a plurality of designated spaces arranged to display a plurality of symbols, wherein a space of the designated spaces is populated with a symbol from the plurality of symbols by moving the symbol from an initial location, to a final location within the designated space, wherein the game outcome is at least partly dependent on the final location of the symbol.

In one embodiment, the population step is repeated until all designated spaces contain one symbol, the game outcome being dependent on at least one of the arrangement and final location of the plurality of symbols.

In one embodiment, the spaces are provided in a geometric pattern, and may be arranged in a plurality of rows and columns so as to form a symbol space matrix.

In an embodiment the designated spaces are populated with the plurality of symbols in a random order.

In one embodiment, the symbols are moved to their final locations from a plurality of initial locations. The initial location may be within the symbol space matrix.

In one embodiment, the symbols are temporarily displayed in at least one intermediate location before being displayed in the final location.

In one embodiment, each of the plurality of symbols is moved from the initial location to the final location by providing an animation of the movement of the symbol from the initial location to the final location. The animation may simulate a flicking motion from the initial location to the final location.

In one embodiment, the game outcome is communicated to a player once all of the plurality of symbols are displayed in each of the final locations.

The method may further include prompting a player for input, wherein the step of moving a symbol from an initial location, to a final location within the designated space occurs on receipt of the player input.

In one embodiment, the method includes moving at least one symbol separate to the plurality of symbols from the initial location, to a final location outside of the designated spaces, the at least one separate symbol not having any influence on the game outcome.

In an embodiment, the plurality of symbols are selected from at least one spinning reel located within a reel window. The initial location may be within the reel window.

In accordance with a second aspect, the present invention provides a gaming device arranged to display a game outcome, including, a display including a plurality of designated spaces arranged to display a plurality of symbols, a module arranged to send instructions to the display, to cause the display to populate a space of the designated spaces with a symbol from the plurality of symbols by moving the symbol from an initial location, to a final location within the designated space, wherein the game outcome is at least partly dependent on the final location of the symbol.

In an embodiment, the module is further arranged to populate the remaining designated spaces with symbols from the plurality of symbols, wherein the game outcome is dependent on at least one of the arrangement and location of the symbols populating the designated spaces.

In an embodiment, the spaces are provided in a geometric pattern. The geometric pattern may include a plurality of rows and columns forming a symbol space matrix.

In an embodiment, the symbols are moved to their final locations from at least one initial location.

In an embodiment, the at least one initial location is within the symbol space matrix.

In an embodiment, the symbols are temporarily displayed in at least one intermediate location before being displayed in their final location.

In an embodiment, the display implements and animation module operable to provide an animation of the movement of the symbols from the initial location to the final location.

In an embodiment, the animation simulates a flicking motion from the initial location to the final location.

In an embodiment, the display communicates the game outcome to a player once all of the plurality of designated symbol spaces have been populated.

In an embodiment, the device further includes an input module arranged to, on receipt of the player input, instruct the module to move the symbol(s) from the initial location to the final location.

In an embodiment, the module is further arranged to move at least one separate symbol from an initial location to a final location outside of the designated spaces, the at least one separate symbol not having any influence on the game outcome.

In accordance with a third aspect, the present invention provides a computer programme including instructions for controlling a computer to implement a gaming system or method in accordance with the first aspect and second aspects of the invention.

In accordance with a fourth aspect, the present invention provides a computer readable medium providing a computer programme in accordance with the third aspect of the invention.

BRIEF DESCRIPTION OF THE DRAWINGS

Features and advantages of the present invention will become apparent from the following description of embodiments thereof, by way of example only, with reference to the accompanying drawings, in which.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION OF AN EMBODIMENT

An embodiment described herein provides a method of populating symbol spaces on a gaming device. The method includes providing a plurality of designated spaces arranged to display a plurality of symbols. Each of the designated spaces are populated with a symbol from the plurality of symbols by moving respective symbols from an initial location, to a final location within each of the designated spaces. The game outcome is dependent on at least one of the arrangement and location of the symbols populating the designate spaces.

The gaming device (which implements the aforementioned method) may be provided in a number of different forms.

In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Figure 1:
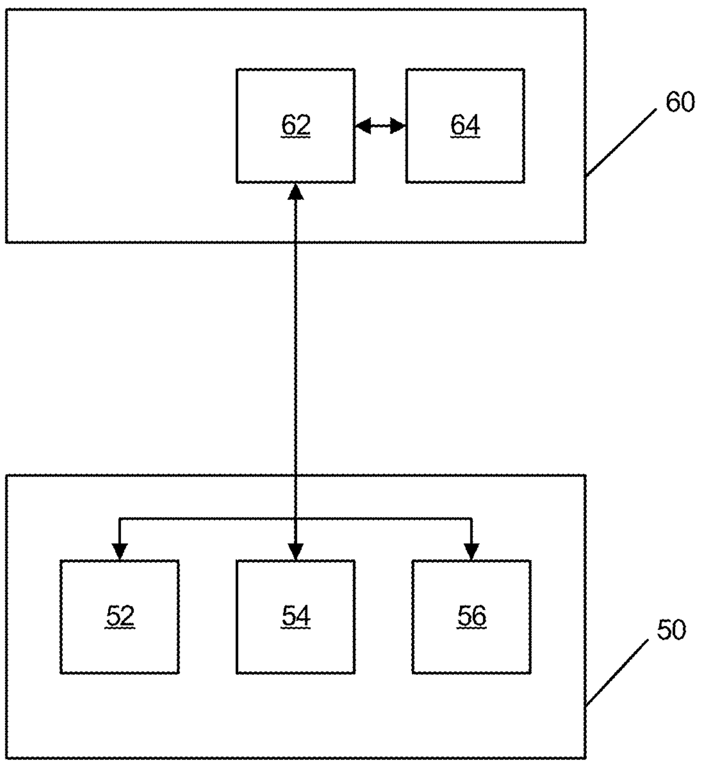
FIG. 1 is a schematic block diagram of core components of a gaming system in accordance with an embodiment of the present invention.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term “processor” is used to refer generically to any device that can process game play instructions in accordance with game play rules and may include: a microprocessor, microcontroller, programmable logic device or other computational device, a general purpose computer (e.g. a PC) or a server.

Figure 2:
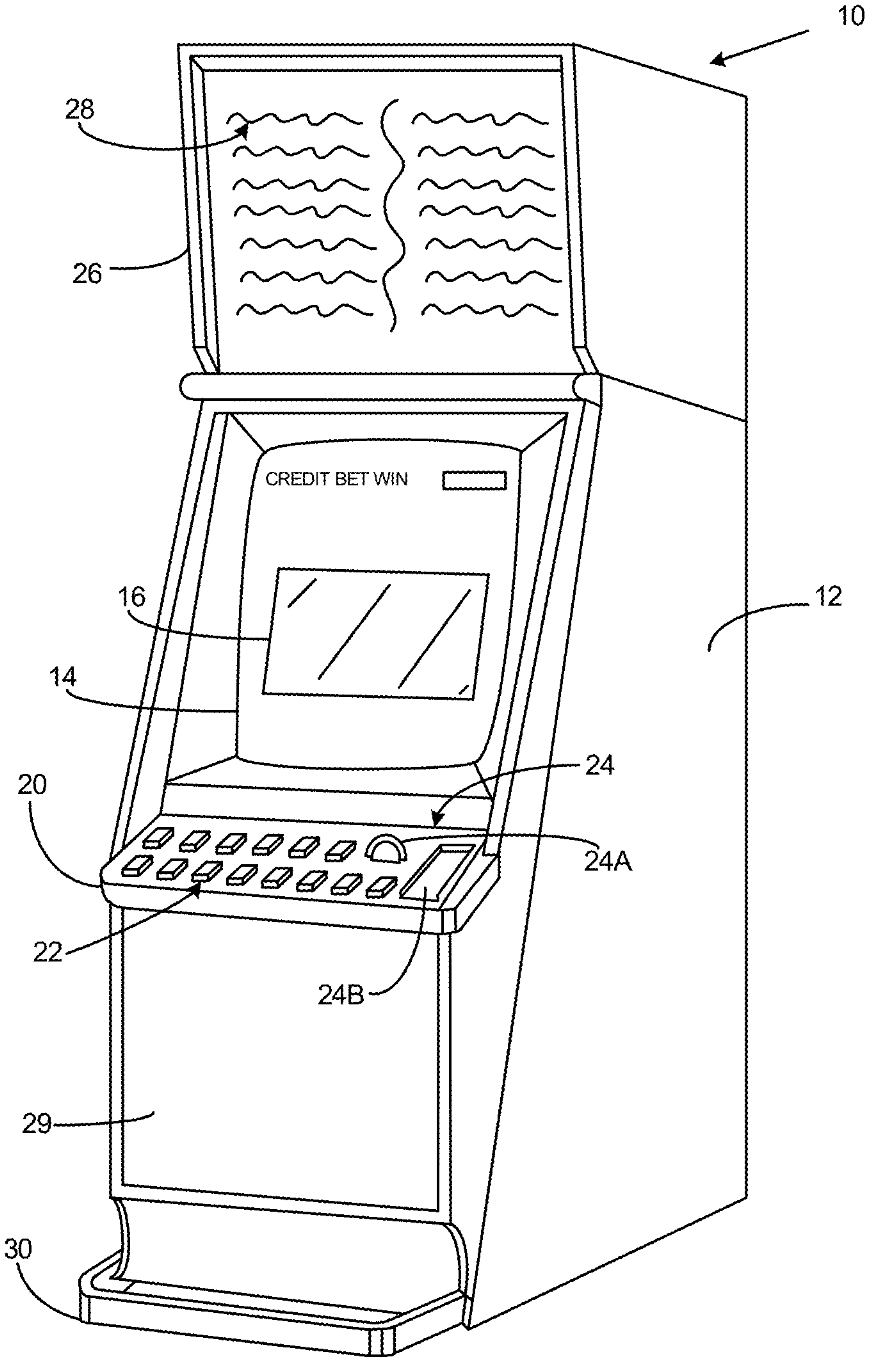
FIG. 2 is a diagrammatic representation of a gaming system in accordance with an embodiment of the present invention with the gaming system implemented in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
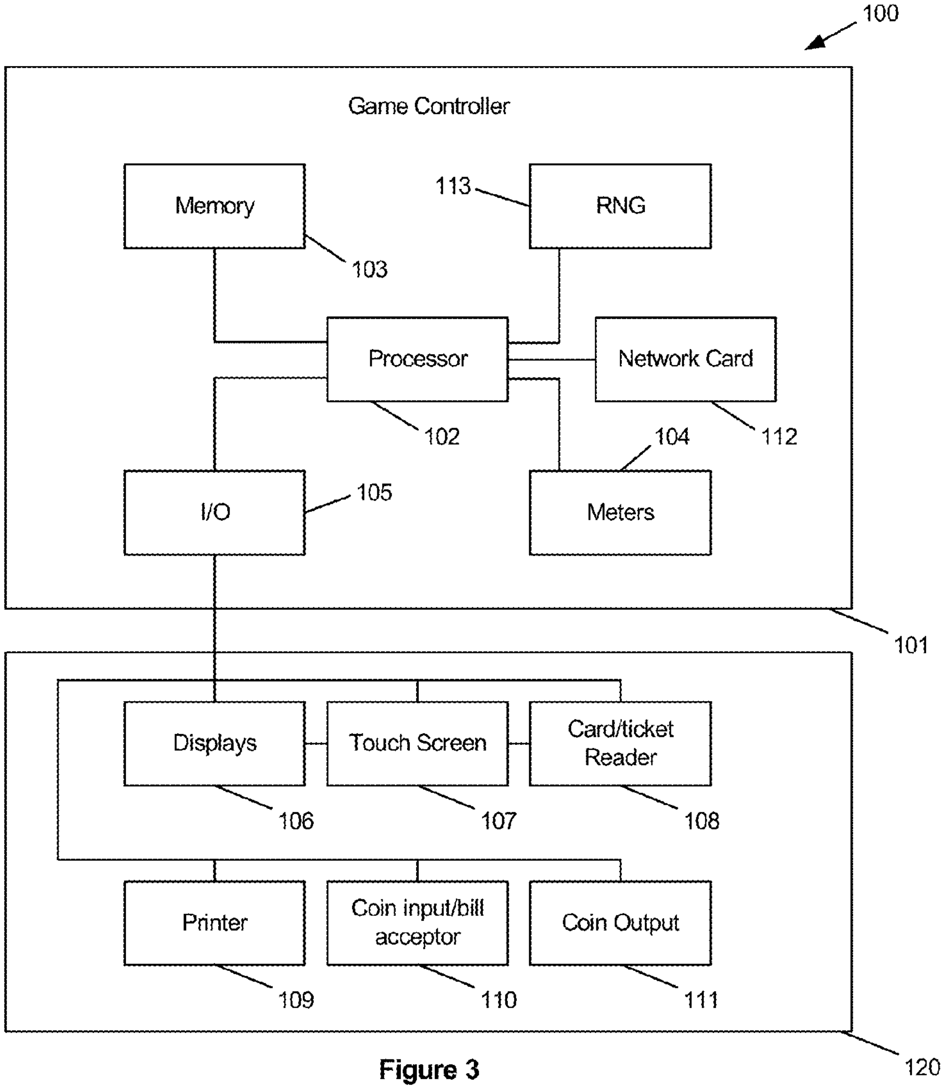
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
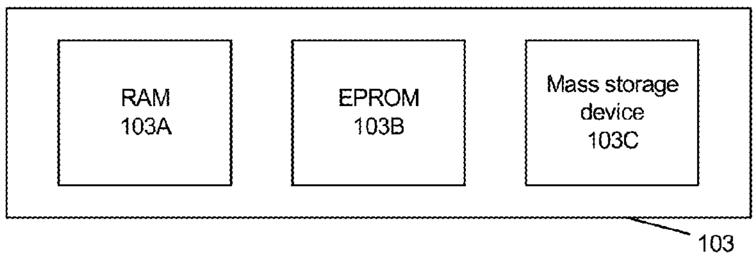
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
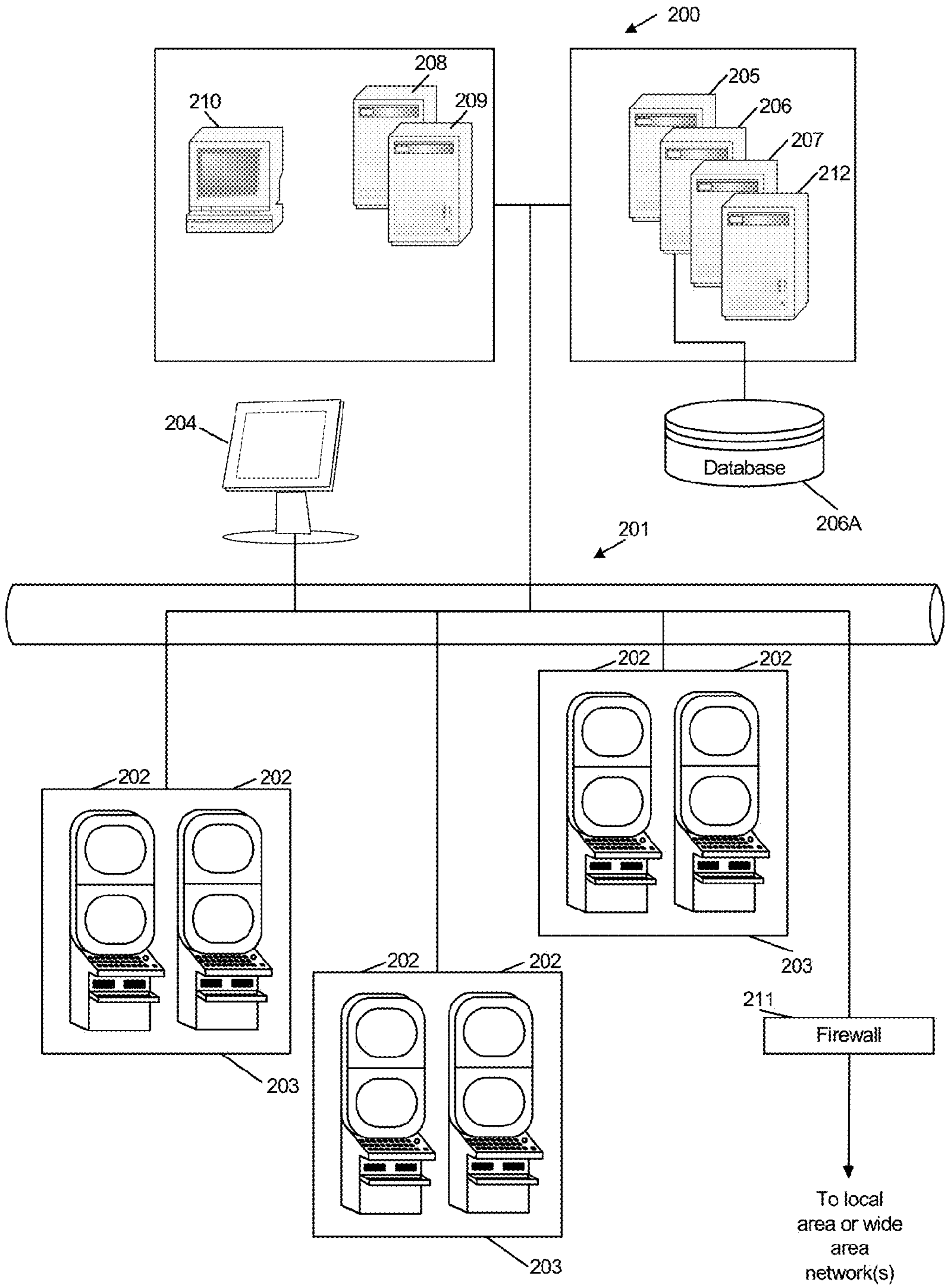
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the rules and/or guidelines for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting in respect of the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine.

Alternatively, a separate random number generator server could be provided. Further, persons skilled in the art will appreciate that a plurality of games servers could be provided to run different games or a single game server may run a plurality of different games based on the terminals.

Exemplary embodiments of the present invention relate to a spinning reel type game. Gaming systems for implementing games that involve a display of spinning reels as part of the display of the outcome of a game have either a video display or a mechanical display, these later machines most usually being "stepper" machines which have a separate motor for each reel. However, persons skilled in the art will appreciate that the invention can be implemented in respect if other forms of games, including; card games; ball draw games (e.g. bingo or keno); dice games; and pin and ball games.

In some implementations the game controllers of such gaming machines select symbols by employing a stop determining function that randomly determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" or "symbol space matrix" visible to the player on the display that which corresponds to a player playing a single win line. When a reel stops, the symbols will be in one of a plurality of possible symbol positions for that reel relative to the stop position.

Spinning reel type games typically allow a player to select how many win lines of a plurality of win lines they will play in each game—i.e. a minimum of one win line up to the maximum number of win lines allowed by the game. Persons, skilled in the art, will appreciate that in other embodiments, the player may select a number of reels to play.

Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. Some of the win lines will be horizontal or diagonal lines but others may be non-linear combinations of symbols. Typically, the win lines will be constituted by symbol positions in the visible window. A game outcome is determined based on the symbols on the win lines and a prize table that specifies awards.

Further Detail of Gaming Device

Figure 6:
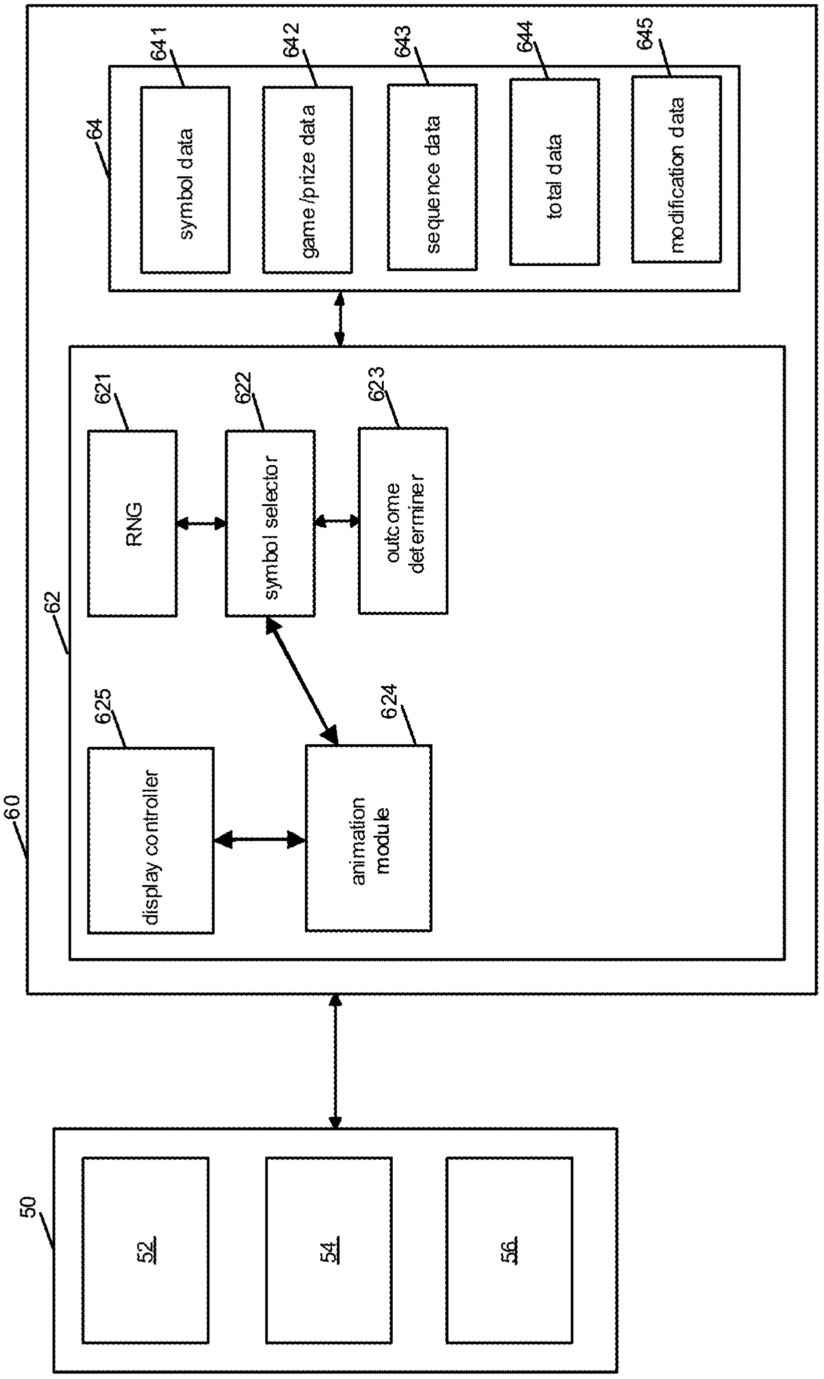
FIG. 6 is a schematic diagram of functional components of a gaming device in accordance with an embodiment of the present invention.

The game controller 60 of the embodiment is shown in more detail in FIG. 6. It will be apparent that the processor 62 implements a number of modules, namely random number generator module (RNG) 621, symbol selector module 622, outcome determiner module 623, animation module 624, and display controller module 625 based on data stored in memory 64. Memory 64 holds symbol data 641, game/prize data 642, sequence data 643, total data 644 and modification data 645. Persons skilled in the art will appreciate that not all modules need be implemented by processor 62. For example, the random number generator module 621 could be implemented by a separate circuit or by a random number generator server.

The animation module 624 is employed to create and control a suitable animation sequence for display. The animation module 624 co-operates with the display controller 625 to provide a suitable animated display sequence in accordance with the method described herein. Of course, it will be understood that the animation module 624 may be separate from, or incorporated with, any one of the other modules described herein. Such variations and modifications are within the purview of a person skilled in the art.

The method 700 of the embodiment is described with reference to FIG. 7*a*. At step 710 it is determined that a game sequence should commence. The game controller 60 then carries out a game event (step 720), determines the game outcome (step 730), utilises the animation module 624 (in conjunction with the display controller 625) to display the symbols in accordance with the methodology described below (step 740), and, if an award is due to the player, provides the award to the player (step 750). Note that the term "award" refers to credits or other bonuses (such as free games) payable to the player, once the game outcome is determined.

Figure 7A:
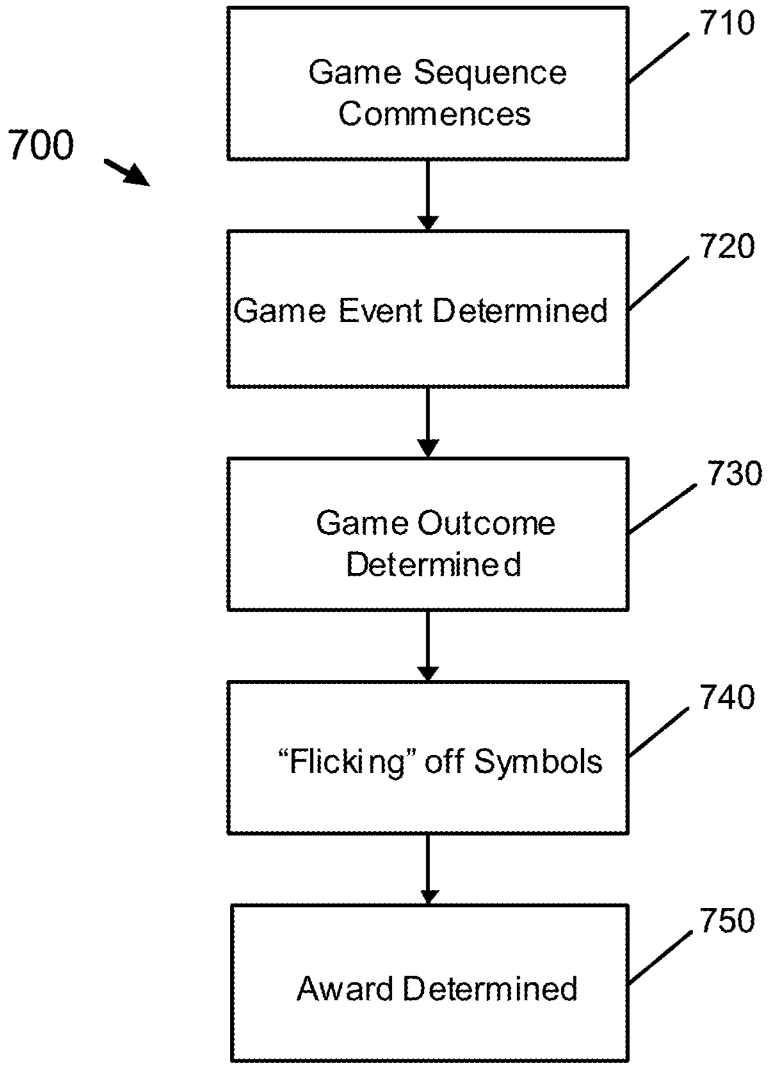
FIGS. 7*a* and 7*b* are flow diagrams illustrating operation of a gaming device in accordance with an embodiment of the present invention.
Figure 7B:
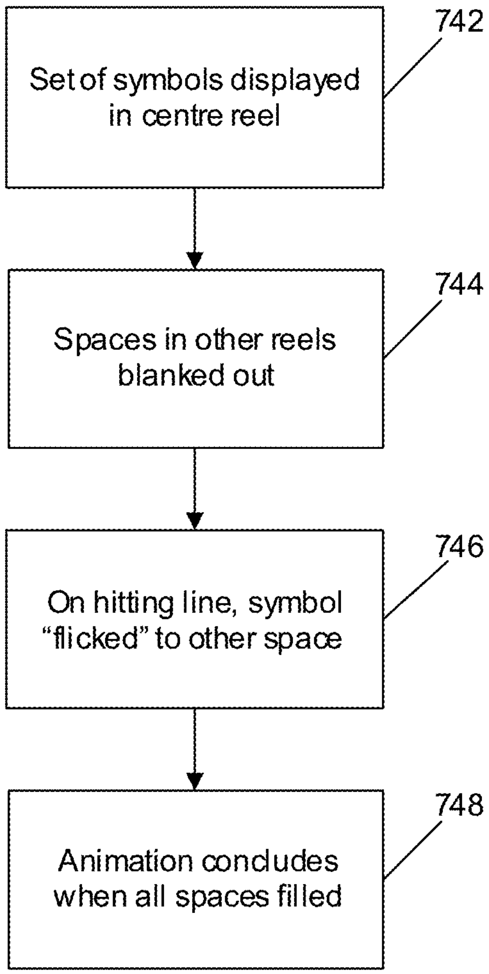

Referring now to FIG. 7*b*, step 740 of FIG. 7*a* is described in more detail. There are provided a number of spaces on the display of a gaming machine, which in the presently described embodiment are termed "reel window positions". Each space is capable of displaying one symbol. The spaces are generally arranged in a geometric pattern, such as a square or rectangular grid including a plurality of rows and columns so as to form a symbol space matrix. For example, referring to FIG. 8A, there is shown a symbol space matrix 800 including 3 rows and 5 columns (reels), such that the total number of symbols that can be displayed are 3*5=15 symbols.

On a player initiating a game, the central reel column 802*a* displays a set of symbols in each of the spaces that define the central reel (i.e. one symbol for each space on the reel) 742. The symbols, once displayed in the spaces that define the central reel column 802*a*, are held in an initial or first position or location. The spaces in the other reel columns 802*b, c, d* and *e* are initially blank (744). This is shown, by way of example, in FIG. 8A.

It will be understood that, from the perspective of the player, the centre reel 802*a* conceptually "holds" the entire 15 symbols. However, during the initial process of displaying the symbols, only 3 symbols are displayed in the centre reel 802*a* at any one time (in FIG. 8A, the symbols initially displayed in the centre reel being a "WILD", "Q" and "10" symbol). The thick line 804 at the bottom of the centre reel 802*a* (shown in FIGS. 8A and 8B) indicate to a player that when a symbol "hits" or comes into contact with the line 804, the symbol will be flicked or bounced from the current space to another position on the display (746). In other words, when a symbol is displayed as coming into contact with the line 804, an animation of the symbol being "flicked" off the reel is provided and the symbol lands in one of the blank spaces (reel window positions). That is, the symbols are moved from an initial or first location, to a final location, where the final location of the symbol provides the player with an indicator of the game outcome. The animation finishes 748 when all spaces have been filled.

Figure 8A:
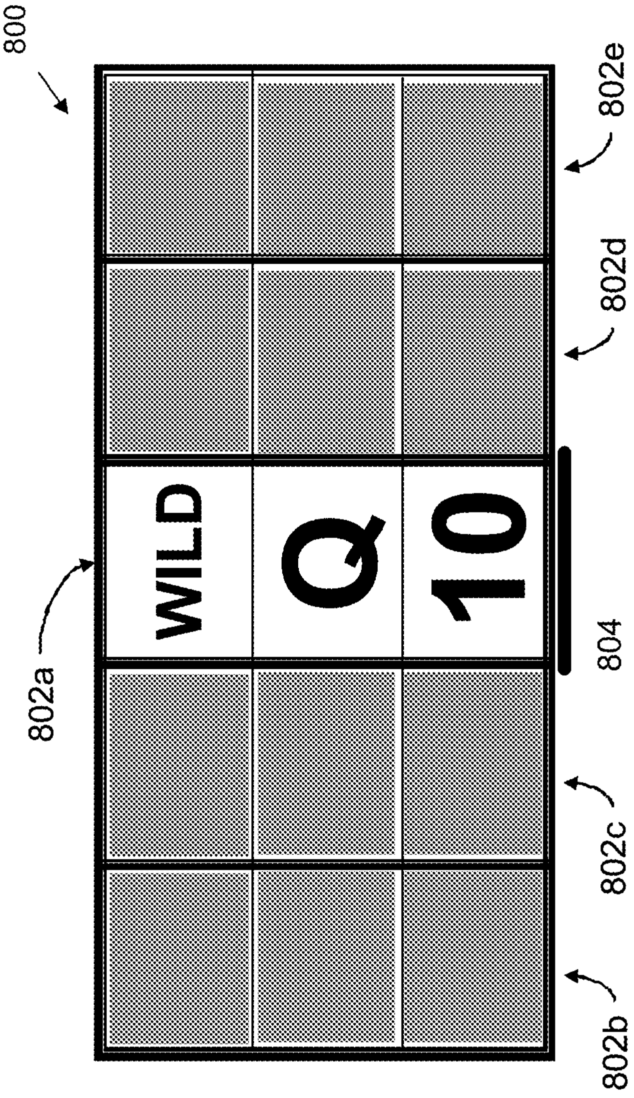
FIGS. 8A and 8B are representations of an example display generated by a gaming device in accordance with an embodiment of the present invention.
Figure 8B:
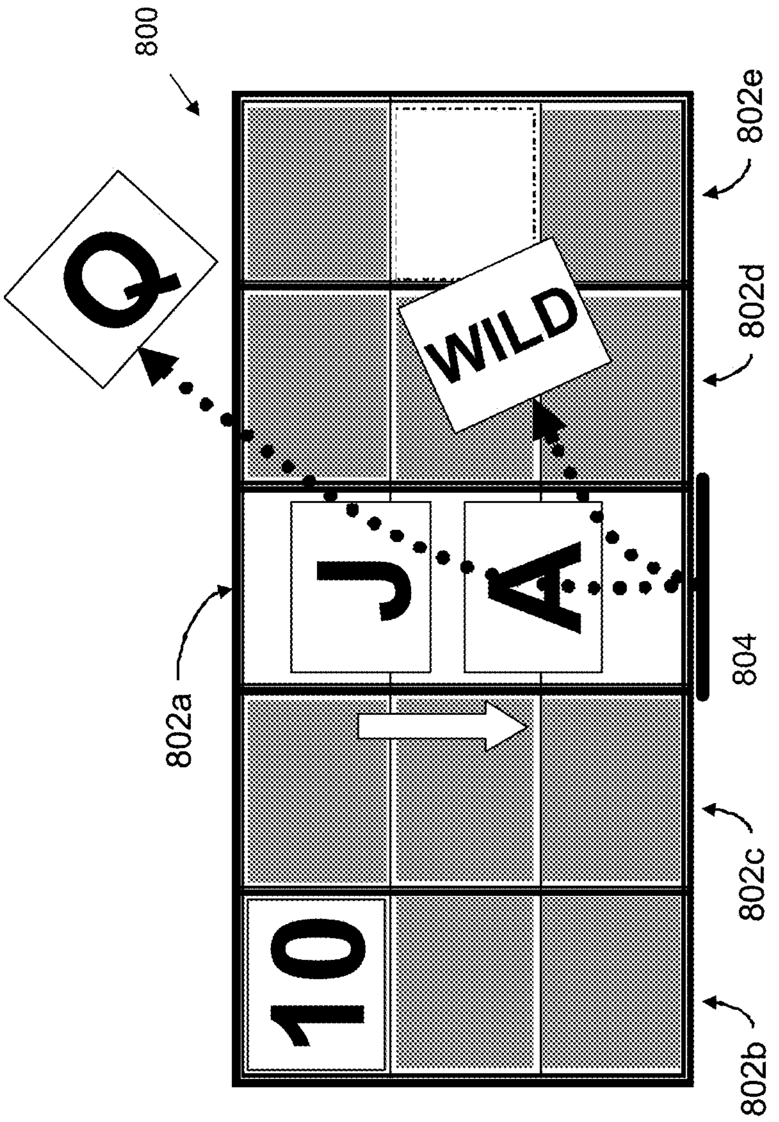

A representation of an example "flicking" motion (as carried out by the animation module 624) is shown in FIG. 8B. According to FIG. 8B, the "10" symbol has been flicked to the first symbol position on the first reel 802*b*, the "WILD" symbol is in the process of being flicked to the second position on the fifth reel 802*e*, while the "Q" symbol is deemed as a separate symbol (i.e. not utilised for determining a game outcome) and therefore flicked off the screen 800. As each symbol is flicked, a new symbol appears in the initial space originally occupied by the "flicked" symbol. It will be understood that the new symbol may appear in any suitable manner, such as materialising in the initial location originally populated by the flicked off symbol (to provide the illusion that the new symbol was hiding or located behind the flicked off symbol).

Alternatively, the symbols in the centre reel 802*a* may move downwards (to provide the illusion that the centre reel is "spinning"), thereby creating the illusion that another symbol is moving into the location vacated by the flicked symbol. For example, in the embodiment described herein, the symbols "fall" down the centre reel and on to the thick line 804, such that as one symbol is flicked, another symbol falls, to replace the symbol that has been flicked. In other words, a symbol may move from an initial location, to one or more intermediate positions, before being "flicked" into a final location.

When all spaces (reel window positions) have been filled, the game outcome is apparent to the player and, if a win has occurred, the player is informed of the win and credited, as required. Of course, it will be understood that the determination of a win can be calculated before the symbols are displayed. Alternately, the game outcome determination (made by the outcome determiner module 623) may only occur once all the symbols are displayed in their final locations. Such variations are within the purview of a person skilled in the art.

In other words, the general sequence of determining a game outcome, in accordance with an embodiment of the invention, can be described as follows:

1. The player initiates a game event, which causes the game to access the random number generator 621 to determine which symbols will be shown in each space (742);
2. Once the symbols are determined, the centre reel spins, revealing a first set of symbols. The symbols move in a downward manner, to provide the appearance that symbols are moving downwards along the centre reel (744);
3. When a symbol reaches the bottom of the reel, the symbol is flicked to a space (746); the position to which the symbol is flicked may be predetermined, or it may be determined "on the fly" (e.g. with the assistance of the RNG 621); If the symbol is to be flicked to more than one space, then a further determination may be made to place the symbol randomly in any one of the acceptable spaces; alternatively, the decision may be made in a predefined manner.
4. Once symbols have been placed in each of the spaces, the game concludes and an award determination can be made and communicated to the player (748).

The manner in which the position for each symbol is determined may be achieved in a number of ways, including but not limited to:

1. A standard spinning reel decision algorithm. The algorithm holds in memory a reel strip and the random number generator 621 determines for each given reel which symbol (stored in memory 64 as symbol data 641) will be placed in which reel position.
2. Each position in a reel window is considered an independent reel. Each position therefore has a reel strip allocated to it (on a 3*5 matrix, this equates to 15 reel strips). The random number generator 621 then selects the symbol to be shown on each reel.
3. The symbol to be shown in each space is selected from a reel strip which changes as selections are made. Hence, in the first instance the reel strip has N positions and the random number generator 621 selects a stopping position which determines the symbol (say X) to be shown in the first location. The reel strip can be, optionally, modified to remove all X symbols from the reel strip and then the random number generator 621 is used to find the next stopping position on that reel. The process continues until all the positions on that reel are filled. The process is then repeated for each "reel strip"

In addition to determining the manner in which a symbol may appear in a space, there are also a number of methods for determining the manner in which a "reel" is constituted. For example, the reel strip can be defined in software and then spun. Any symbols not required by the decision of the random number generator for populating the designated spaces can be flicked off the screen 800.

Alternatively, the reel strip can be compiled in an ad-hoc method and then spun. Again, any symbols not required can be flicked off. In a third example, the reel strip is compiled by the software once the random number generator 621 has determined which symbols are required for populating the designated spaces. In the case of a 3*5 matrix, 15 symbols are required so the reel strip has 15 symbols on it.

In the embodiment described, one column (reel) of symbols is initially displayed. It will be understood that any number of columns, rows or random arrangement of symbols may be initially displayed, and the symbols may be "flicked" or otherwise moved into final positions in any suitable manner.

The example provided at FIGS. 8A and 8B initially displays three visible symbols. A different number of symbols may be initially displayed, depending on the layout of the gaming machine display.

It will also be understood that "irrelevant" or false symbols (i.e. symbols that are not relevant to the game outcome) may also appear in the initial display of symbols. Such symbols are "flicked" off the display, such that they do not occupy a final space on the symbol matrix 800. For example, in FIG. 8B, the "Q" symbol is determined by the controller as being a false symbol and is therefore flicked off the symbol matrix 800. This technique has the effect of keeping the player guessing as to the final outcome of the game event, thereby adding an extra level of enjoyment for the player, as the player may see a symbol in an initial location, but will not be able to predict whether the symbol forms part of the game outcome until the symbol either settles at a final location, or alternatively, bounces or flicks off the screen 800. The use of such symbols also reduces the probability of the player predicting the exact outcome of the game until such time as all symbols are located in their final designated spaces.

Moreover, in the example given, the reel on which symbols are initially displayed (in the illustrated embodiment, reel 802*a*) forms part of the spaces available for symbols and therefore forms part of the game outcome display. However, it will be understood that symbols may initially appear in an area of the display, such as on separate reel which does not form part of the symbol space matrix, or outside the grid of allocated spaces which is arranged to display the final symbols. Such variations are within the purview of a person skilled in the art.

Lastly, in an alternative embodiment, a player may have some control over the symbols that are chosen. For example, there may be provided a single reel, which spins constantly during game play. In order to select symbols, the player presses a "stop" or "select" button at random times (chosen by the player), in an attempt to "choose" which symbols are flicked off into the spaces. This provides the player with a greater feeling of control over the game process and correspondingly, encourages the player to interact with the game.

Other additional games, such as bonus games, "re-spins", jackpots and other features could be incorporated into the display methodology described herein.

In the embodiment described herein, the reel spins and the symbols are "flicked". It will be understood that other visually interesting methods may be utilised to move the symbols from a first position to a final position (and through a range of intermediate positions, if necessary). For example, animations such as a baseball or cricket bat "hitting" the symbols into position, a hand throwing the symbols into position, a foot or boot kicking the symbols into position, or any other suitable animation may be utilised, without departing from spirit of the inventive concept described herein.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A method of populating symbol spaces on a gaming device, the method comprising:

receiving, at a credit input mechanism of the gaming device, a credit input for establishing a credit balance, the credit input mechanism including at least one of a coin input chute, a bill collector, a card reader, and a ticket reader, wherein the credit balance is decreased in response to receiving a wager for a game on the gaming device;

providing, upon receipt of the wager, a plurality of designated spaces arranged to display a plurality of symbols;

displaying an initiator associated with an initial location within the plurality of designated spaces, the initiator positioned adjacent to the initial location; and moving each symbol of the plurality of symbols from the initial location within the plurality of designated spaces to a respective final location within the plurality of designated spaces based on the initiator until all designated spaces of the plurality of designated spaces are populated with one symbol, wherein the initial location and the respective final locations are different designated spaces of the plurality of designated spaces, and wherein a game outcome is at least partly dependent on at least one of an arrangement and a location of the plurality of symbols populating the plurality of designated spaces.

2. A method in accordance with claim 1, wherein the plurality of designated spaces are provided in a geometric pattern.

3. A method in accordance with claim 2, wherein the plurality of designated spaces are arranged in a plurality of rows and columns forming a symbol space matrix.

4. A method in accordance with claim 1, wherein the plurality of designated spaces are populated with the plurality of symbols in a random order.

5. A method in accordance with claim 1, wherein a first symbol of the plurality of symbols is temporarily displayed in at least one intermediate location before being displayed in the respective final location associated with the first symbol.

6. A method in accordance with claim 1, wherein moving each symbol of the plurality of symbols further comprises displaying moving each symbol from the initial location to the respective final location.

7. A method in accordance with claim 6, wherein moving each symbol of the plurality of symbols simulates a flicking motion from the initial location to the respective final location.

8. A method in accordance with claim 1, wherein the game outcome is communicated to a player once all of the plurality of symbols are displayed in each of the respective final locations.

9. A method in accordance with claim 1, further comprising prompting a player for input, wherein moving each symbol of the plurality of symbols from the initial location to the respective final locations within the plurality of designated spaces occurs on receipt of the player input.

10. A method in accordance with claim 1, further comprising moving at least one symbol separate from the plurality of symbols from the initial location to a final location outside of the designated spaces, the at least one separate symbol not having any influence on the game outcome.

11. A method in accordance with claim 1, wherein the plurality of symbols are selected from at least one reel located within a reel window and wherein the initial location is located within the reel window.

12. A gaming device arranged to display a game outcome, the gaming device comprising:

a credit input mechanism configured to receive a credit input for establishing a credit balance, said credit input mechanism comprising at least one of a coin input chute, a bill collector, a card reader, and a ticket reader, wherein the credit balance is decreased in response to receiving a wager for a game on the gaming device;

a display including a plurality of designated spaces arranged to display a plurality of symbols and an initiator associated with an initial location within the plurality of designated spaces, the initiator positioned adjacent to the initial location; and a processor configured to cause the display, upon receipt of the wager, to move each symbol of the plurality of symbols from the initial location within the plurality of designated spaces to a respective final location within the plurality of designated spaces based on the initiator until all designated spaces of the plurality of designated spaces are populated with one symbol, wherein the initial location and the respective final locations are different designated spaces of the plurality of designated spaces, and wherein the game outcome is at least partly dependent on at least one of an arrangement and a location of the plurality of symbols populating the plurality of designated spaces.

13. A gaming device in accordance with claim 12, wherein the plurality of designated spaces are provided in a geometric pattern.

14. A gaming device in accordance with claim 13, wherein the plurality of designated spaces are arranged in a plurality of rows and columns forming a symbol space matrix.

15. A gaming device in accordance with claim 12, wherein the plurality of symbols populating the plurality of designated spaces are temporarily displayed in a plurality of intermediate locations before being displayed in the respective final locations.

16. A gaming device in accordance with claim 12, wherein the display further comprises an animation module configured to provide movement of each symbol of the plurality of symbols from the initial location to the respective final location.

17. A gaming device in accordance with claim 16, wherein the movement of each symbol of the plurality of symbols simulates a flicking motion from the initial location to the respective final location.

18. A gaming device in accordance with claim 12, wherein the display is configured to communicate the game outcome to a player once all of the plurality of designated spaces have been populated.

19. A gaming device in accordance with claim 12 further comprising an input module configured to instruct the processor to move each symbol of the plurality of symbols from the initial location to the respective final location upon receipt of player input.

20. A gaming device in accordance with claim 12, wherein the processor is further configured to move at least one separate symbol from the initial location to a final location outside of the plurality of designated spaces, the at least one separate symbol not influencing on the game outcome.

21. A non-transitory computer readable medium including a computer program comprising instructions that, when executed, control a computer to implement a gaming device configured to display a game outcome, the gaming device comprising:

a credit input mechanism configured to receive a credit input for establishing a credit balance, said credit input mechanism comprising at least one of a coin input chute, a bill collector, a card reader, and a ticket reader, wherein the credit balance is decreased in response to receiving a wager for a game on the gaming device;

a display including a plurality of designated spaces arranged to display a plurality of symbols and an initiator associated with an initial location within the plurality of designated spaces, the initiator positioned adjacent to the initial location; and a processor configured to cause the display, upon receipt of the wager, to move each symbol of the plurality of symbols from the initial location within the plurality of designated spaces to a respective final location within the plurality of designated spaces based on the initiator until all designated spaces of the plurality of designated spaces are populated with one symbol, wherein the initial location and the respective final locations are different designated spaces of the plurality of designated spaces, and wherein the game outcome is at least partly dependent on at least one of an arrangement and a location of the plurality of symbols populating the plurality of designated spaces.

* * * * *